US010901995B2

(12) United States Patent
Goodman et al.

(10) Patent No.: US 10,901,995 B2
(45) Date of Patent: Jan. 26, 2021

(54) PERFORMING A SEARCH WITHIN A DATA STORAGE LIBRARY

(71) Applicant: International Business Machines Corporation, Armonk, NY (US)

(72) Inventors: Brian G. Goodman, Tucson, AZ (US); Leonard G. Jesionowski, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/128,335

(22) Filed: Sep. 11, 2018

(65) Prior Publication Data

US 2020/0082007 A1  Mar. 12, 2020

(51) Int. Cl.
*G06F 16/2455* (2019.01)
*G11B 17/22* (2006.01)
*G11B 5/008* (2006.01)

(52) U.S. Cl.
CPC ...... *G06F 16/2455* (2019.01); *G11B 5/00813* (2013.01); *G11B 17/22* (2013.01)

(58) Field of Classification Search
CPC .. G06F 16/2455; G11B 5/00813; G11B 17/22
USPC .......................................................... 707/769
See application file for complete search history.

(56) References Cited

U.S. PATENT DOCUMENTS

| | | | |
|---|---|---|---|
| 8,639,870 B2 * | 1/2014 | Hostetter | G06F 3/061 711/111 |
| 2005/0063089 A1 * | 3/2005 | Starr | G11B 15/689 360/92.1 |
| 2006/0215291 A1 | 9/2006 | Jaquette et al. | |
| 2008/0019226 A1 * | 1/2008 | Sasage | G06F 3/0685 369/30.44 |
| 2008/0065582 A1 * | 3/2008 | Goodman | G06F 3/0617 |
| 2015/0092298 A1 * | 4/2015 | Kim | G06F 3/0616 360/92.1 |

* cited by examiner

*Primary Examiner* — Robert W Beausoleil, Jr.
*Assistant Examiner* — Arthur Ganger
(74) *Attorney, Agent, or Firm* — Zilka-Kotab, P.C.

(57) ABSTRACT

A computer-implemented method according to one embodiment includes receiving a search request. Additionally, the method includes transparently loading a data storage cartridge into a data storage drive of a data storage library. Further, the method includes determining search results, utilizing the data storage cartridge and the data storage drive. Further still, the method includes returning the search results.

25 Claims, 13 Drawing Sheets

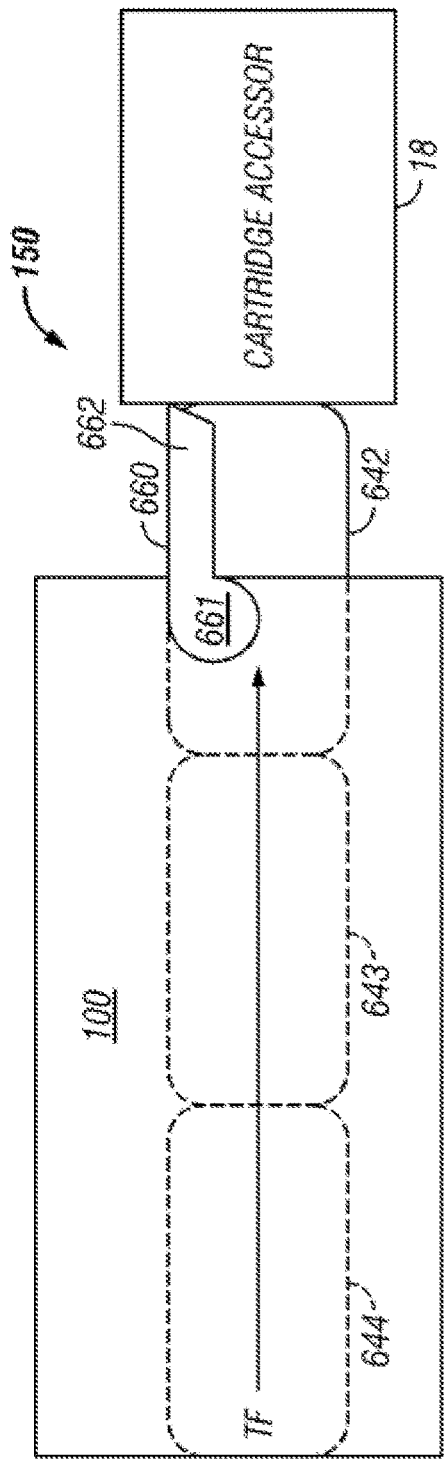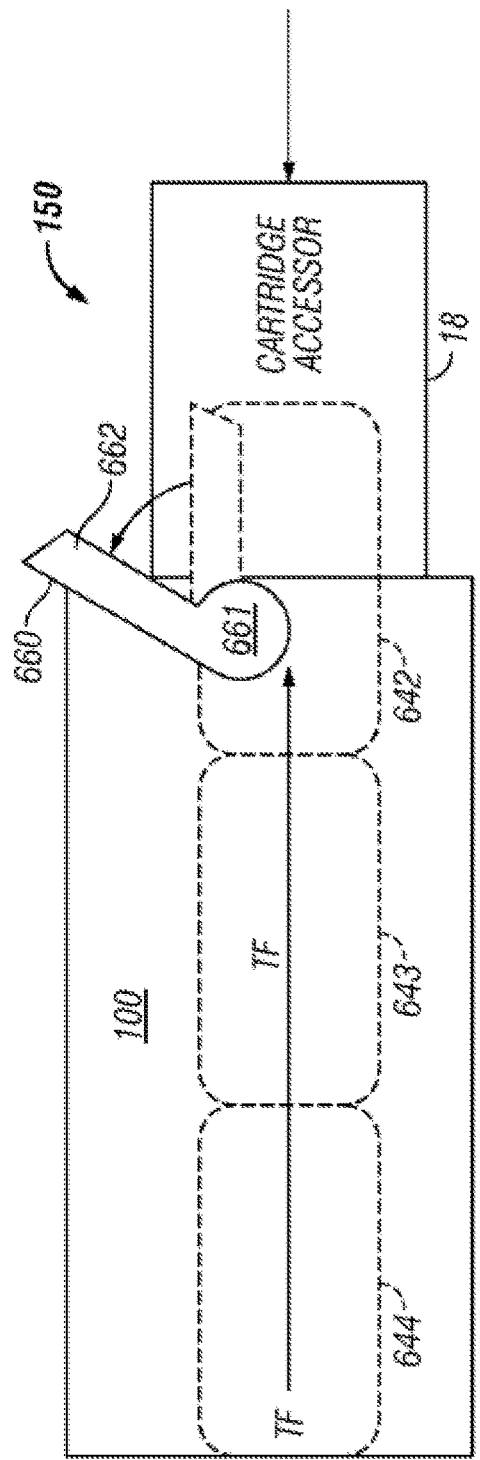
FIG. 8A
FIG. 8B

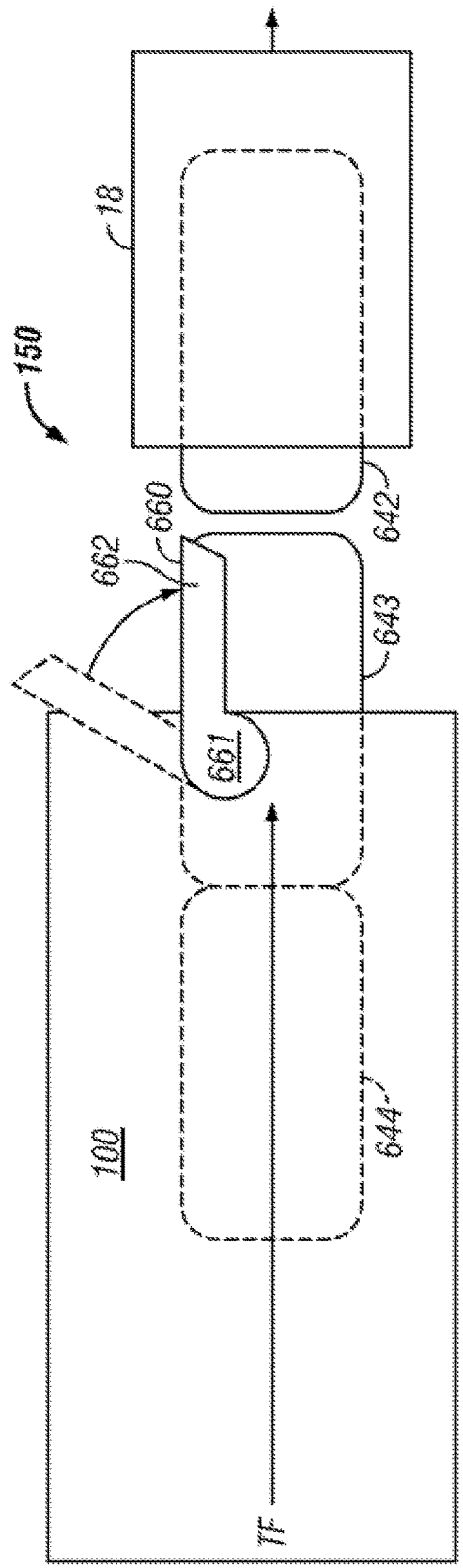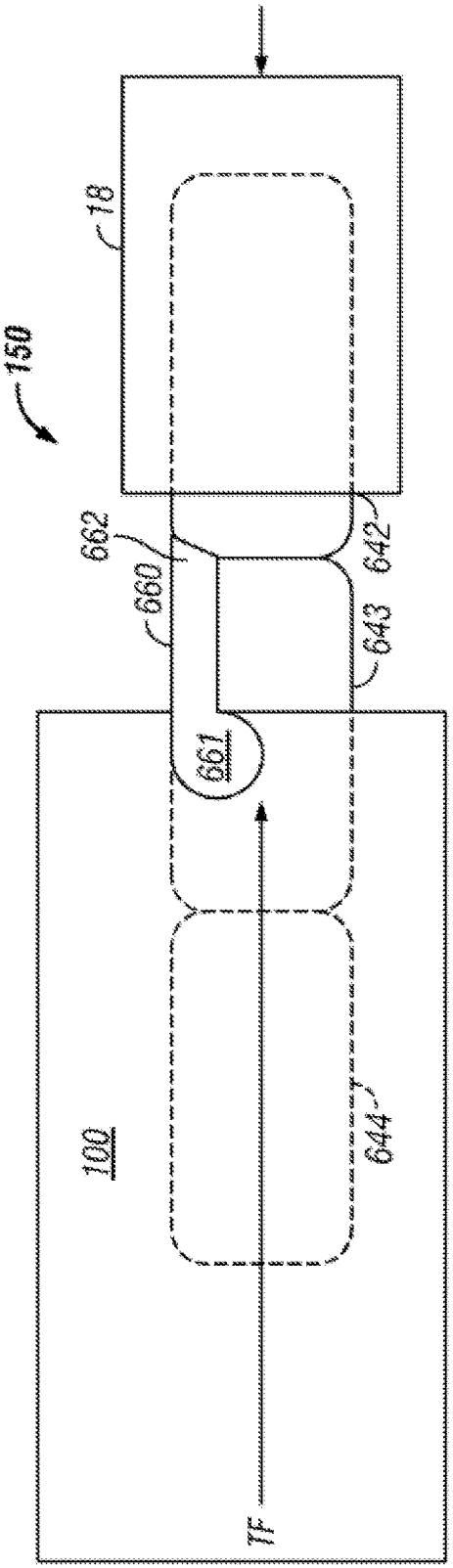

PERFORMING A SEARCH WITHIN A DATA STORAGE LIBRARY

BACKGROUND

The present invention relates to data storage systems, and more specifically, this invention relates to optimizing a search of data located on data storage cartridges.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Additionally, it may be desirable to perform a search on stored data. However, currently, when it comes to searching data stored on removable media, a host application and one or more servers retrieve data from a data storage library and perform the search of the retrieved data by the host application at the one or more servers. This is very resource intensive and includes the writing of scripts (to manage the load, read, search, and search results), server usage, device driver usage, host application usage, and communication path usage, decompression, decryption, etc.

What is needed is a way to perform data search operations on data storage cartridges without a dependency on host systems, host applications, communications links, etc.

SUMMARY

A computer-implemented method according to one embodiment includes receiving a search request. Additionally, the method includes transparently loading a data storage cartridge into a data storage drive of a data storage library. Further, the method includes determining search results, utilizing the data storage cartridge and the data storage drive. Further still, the method includes returning the search results.

In one optional embodiment, transparently loading the data storage cartridge into the data storage drive of the data storage library includes identifying a host application drive that is not currently being used within the data storage library, loading the data storage cartridge into the host application drive, presenting the host application drive as empty to all host applications running on host systems, and presenting the data storage cartridge as being located in a storage slot.

In another optional embodiment, determining the search results includes instructing the data storage drive to perform a search, performing the search at one or more library controllers, or instructing the data storage drive to perform the search and performing the search at one or more library controllers.

In this way, a search may be performed on a data storage cartridge by one or more of the data storage drive and the library controller. This may eliminate a need to perform the search on one or more host systems/host applications, which may reduce an amount of processing necessary by the host systems/host applications, which may in turn improve a performance of the host systems/host applications.

According to another embodiment, a computer program product for performing a search within a data storage library includes a computer readable storage medium that has program instructions embodied therewith, where the computer readable storage medium is not a transitory signal per se, and where the program instructions are executable by a processor to cause the processor to perform a method. Additionally, the method comprises receiving a search request, utilizing the processor. Further, the method includes transparently loading a data storage cartridge into a data storage drive of a data storage library, utilizing the processor. Further still, the method includes determining, utilizing the processor, search results, utilizing the data storage cartridge and the data storage drive. Also, the method includes returning the search results, utilizing the processor.

A library controller according to another embodiment includes a processor, and logic integrated with the processor, executable by the processor, or integrated with and executable by the processor. Additionally, the logic is configured to receive a search request. Further, the logic is configured to transparently load a data storage cartridge into a data storage drive of a data storage library. Further still, the logic is configured to determine search results, utilizing the data storage cartridge and the data storage drive. Also, the logic is configured to return the search results.

A computer-implemented method according to another embodiment includes receiving a search request at a data storage library. Additionally, the method includes transparently loading a first data storage cartridge into a first data storage drive within the data storage library. Further, the method includes initiating a search utilizing the first data storage cartridge and the first data storage drive. Further still, the method includes receiving a request to access data on a second data storage cartridge, utilizing the first data storage drive. Also, the method includes postponing the search utilizing the first data storage cartridge and the first data storage drive. In addition, the method includes transparently removing the first data storage cartridge from the first data storage drive. Furthermore, the method includes loading the second data storage cartridge into the first data storage drive. Further still, the method includes providing access to the data on the second data storage cartridge, utilizing the first data storage drive.

In this way, an effect that the search of the first data storage cartridge has on an availability of the data storage drive may be minimized.

A computer-implemented method according to another embodiment includes receiving a search request. Additionally, the method includes transparently loading a data storage cartridge into a data storage drive of a data storage library, including identifying a data storage drive that is not currently being used within the data storage library, and loading the data storage cartridge into the data storage drive. Further, the method includes determining search results, utilizing the data storage cartridge and the data storage drive. Further still, the method includes returning the search results.

Any of these embodiments may be implemented in any removable media system. For example, a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

Figure 1:
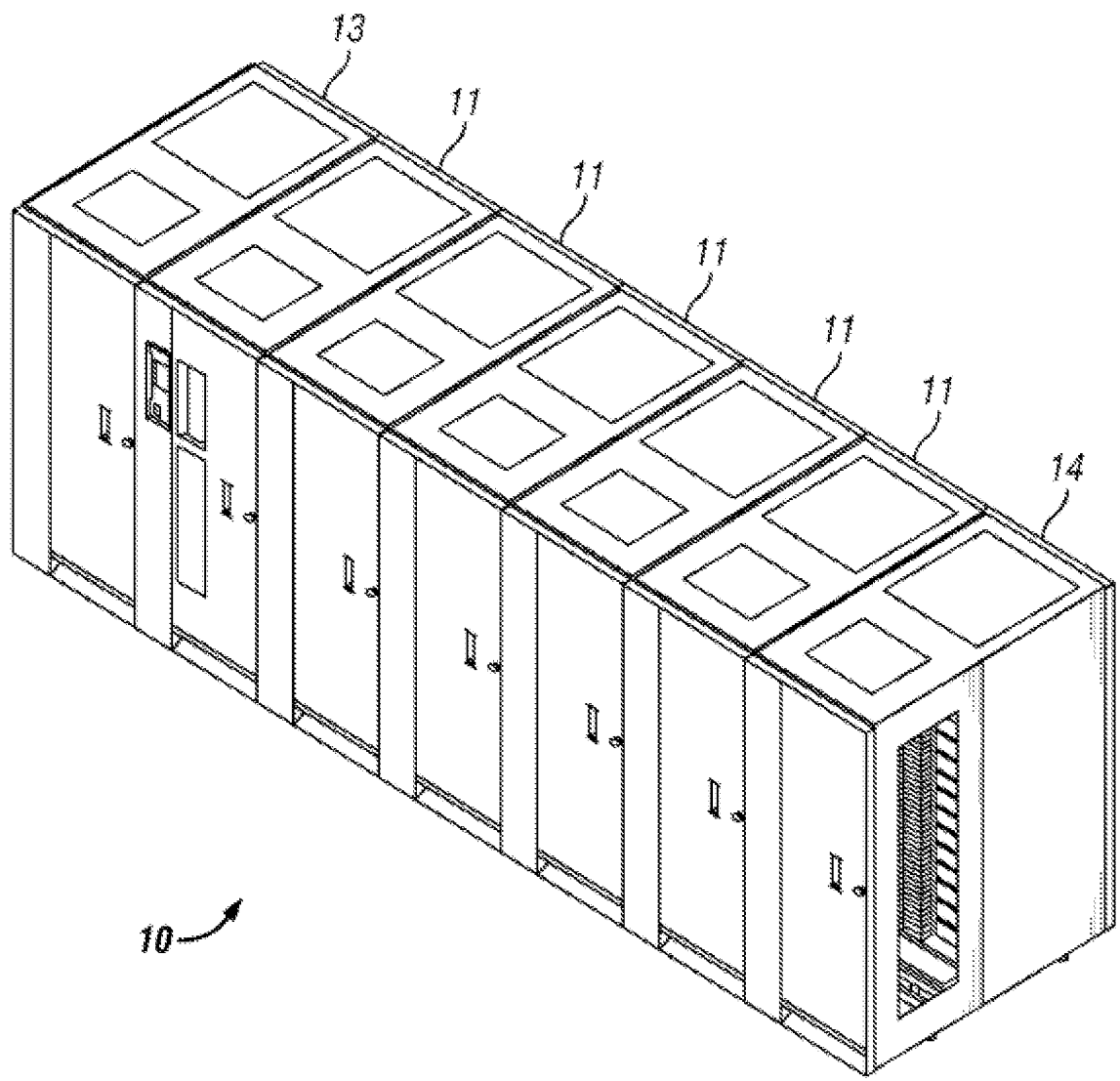
FIG. 1 is a perspective view of an automated data storage library according to one embodiment.

The following description discloses several preferred embodiments of systems, methods and computer program products for performing a search within a data storage library. Various embodiments provide a method for transparently loading a data storage cartridge into an available data storage drive, and performing a search either at the available storage drive or at a library controller of the data storage library.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing a search within a data storage library.

In one general embodiment, computer-implemented method includes receiving a search request. Additionally, the method includes transparently loading a data storage cartridge into a data storage drive of a data storage library. Further, the method includes determining search results, utilizing the data storage cartridge and the data storage drive. Further still, the method includes returning the search results.

In another general embodiment, a computer program product for performing a search within a data storage library includes a computer readable storage medium that has program instructions embodied therewith, where the computer readable storage medium is not a transitory signal per se, and where the program instructions are executable by a processor to cause the processor to perform a method. Additionally, the method comprises receiving a search request, utilizing the processor. Further, the method includes transparently loading a data storage cartridge into a data storage drive of a data storage library, utilizing the processor. Further still, the method includes determining, utilizing the processor, search results, utilizing the data storage cartridge and the data storage drive. Also, the method includes returning the search results, utilizing the processor.

In another general embodiment, a library controller includes a processor, and logic integrated with the processor, executable by the processor, or integrated with and executable by the processor. Additionally, the logic is configured to receive a search request. Further, the logic is configured to transparently load a data storage cartridge into a data storage drive of a data storage library. Further still, the logic is configured to determine search results, utilizing the data storage cartridge and the data storage drive. Also, the logic is configured to return the search results.

In another general embodiment, a computer-implemented method includes receiving a search request at a data storage library. Additionally, the method includes transparently loading a first data storage cartridge into a first data storage drive within the data storage library. Further, the method includes initiating a search utilizing the first data storage cartridge and the first data storage drive. Further still, the method includes receiving a request to access data on a second data storage cartridge, utilizing the first data storage drive. Also, the method includes postponing the search utilizing the first data storage cartridge and the first data storage drive. In addition, the method includes transparently removing the first data storage cartridge from the first data storage drive. Furthermore, the method includes loading the second data storage cartridge into the first data storage drive. Further still, the method includes providing access to the data on the second data storage cartridge, utilizing the first data storage drive.

In another general embodiment, a computer-implemented method includes receiving a search request. Additionally, the method includes transparently loading a data storage cartridge into a data storage drive of a data storage library, including identifying a data storage drive that is not currently being used within the data storage library, and loading the data storage cartridge into the data storage drive. Further, the method includes determining search results, utilizing the data storage cartridge and the data storage drive. Further still, the method includes returning the search results.

Figure 2:
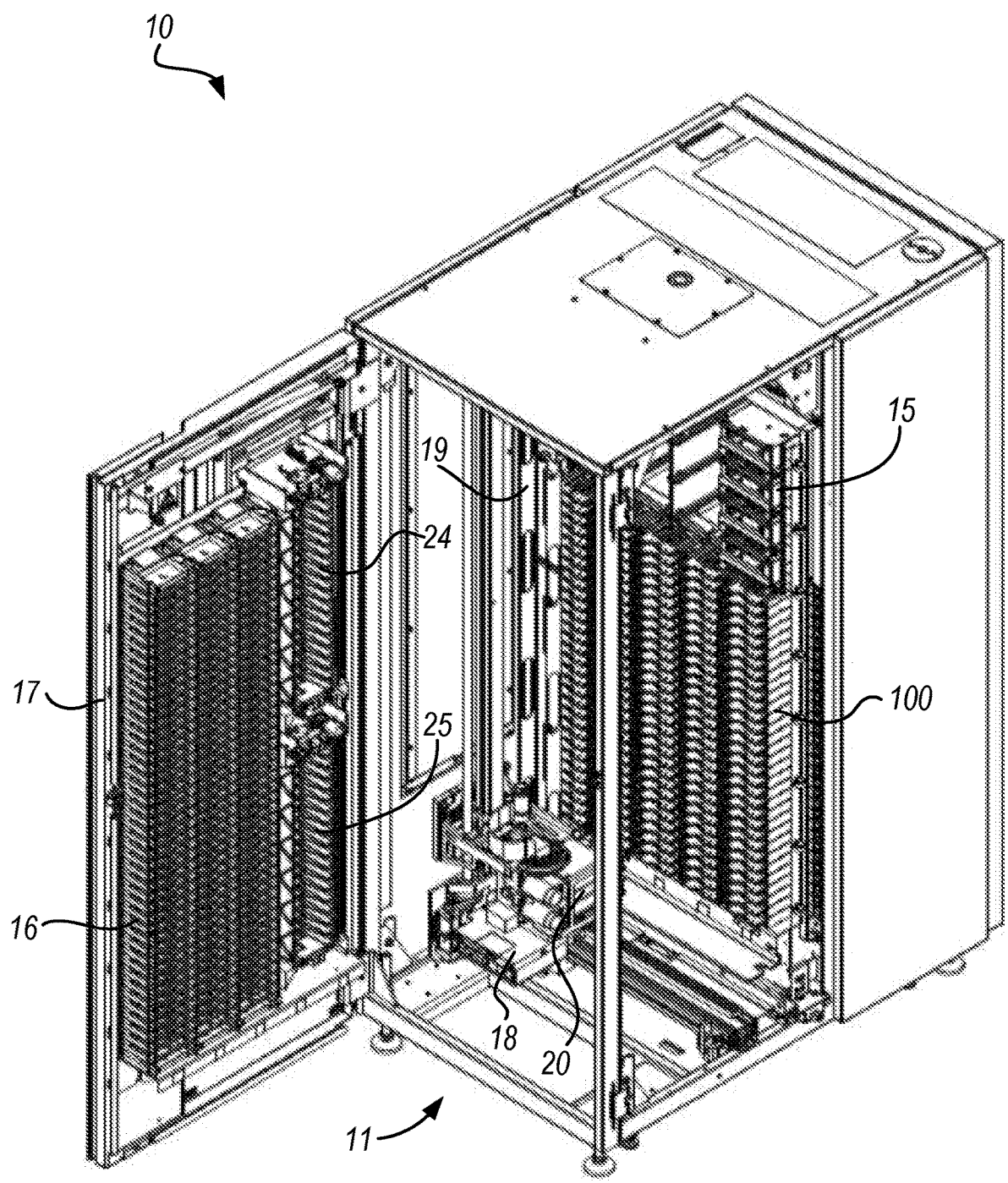
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM TS4500 Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may comprise data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
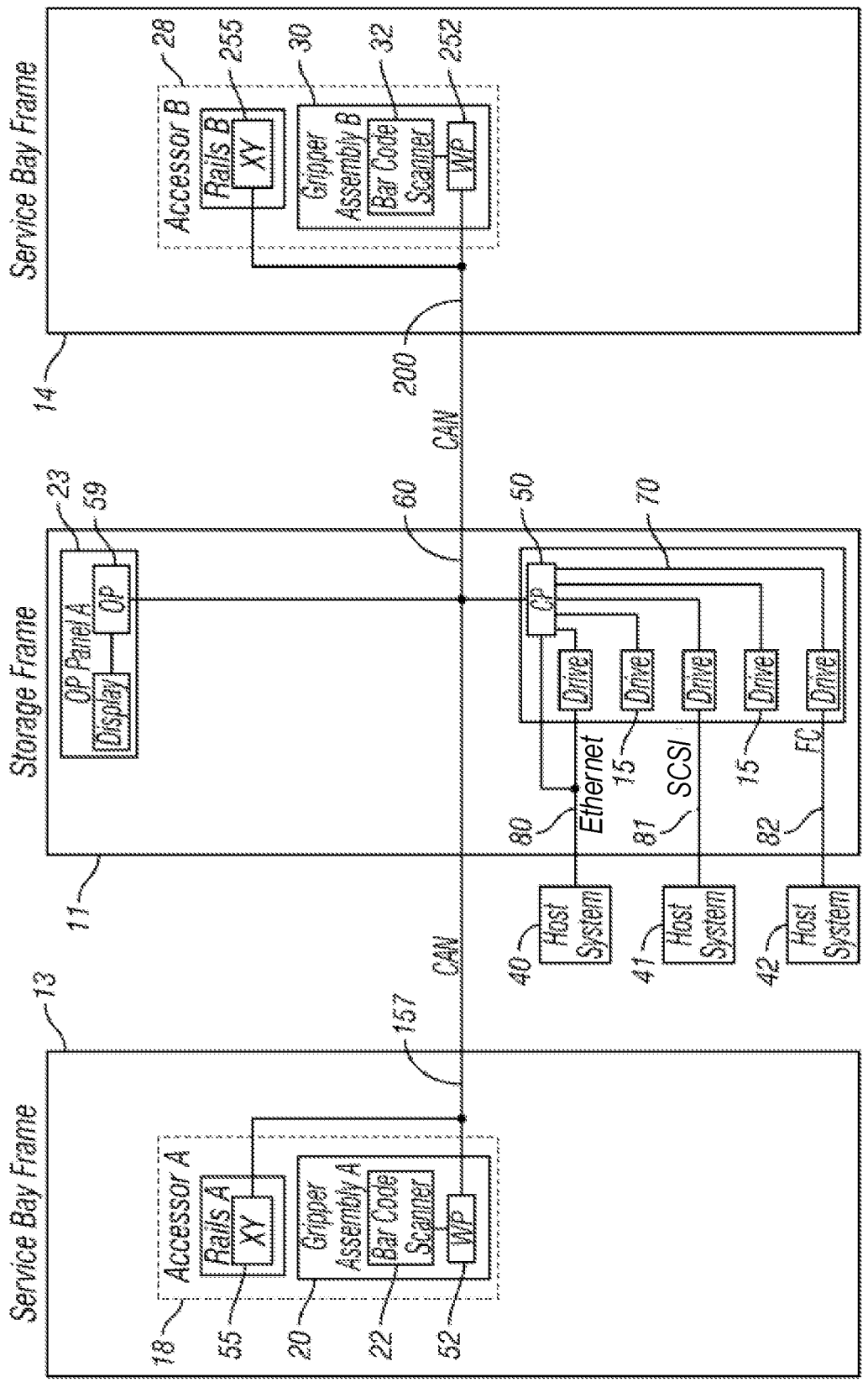
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the automated data storage library 10 in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
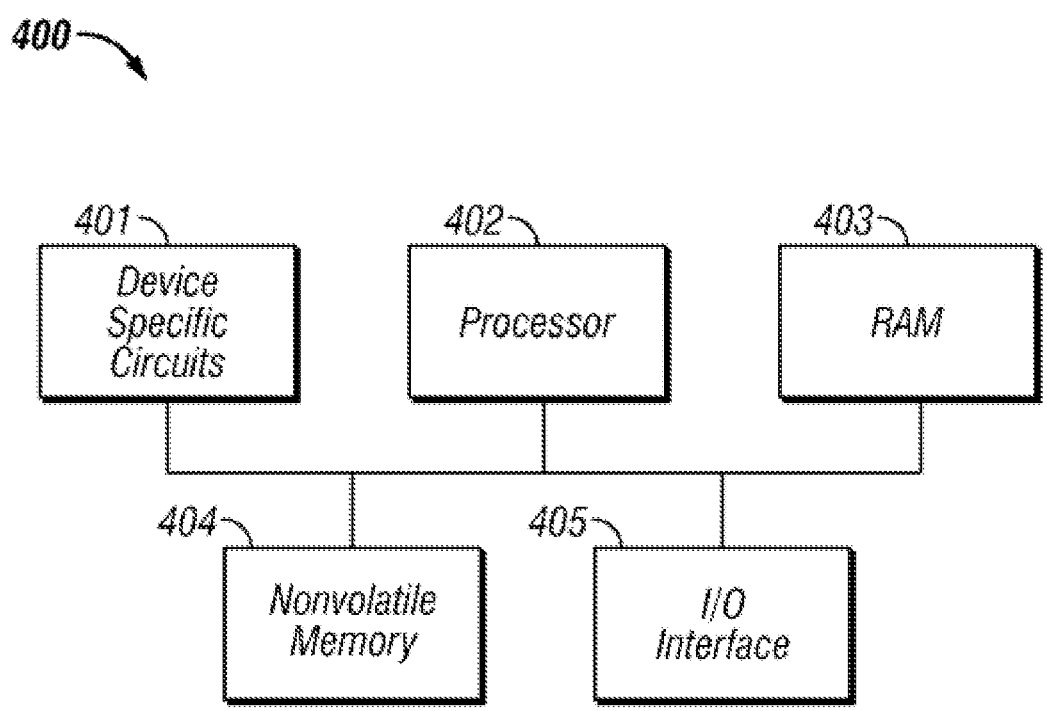
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
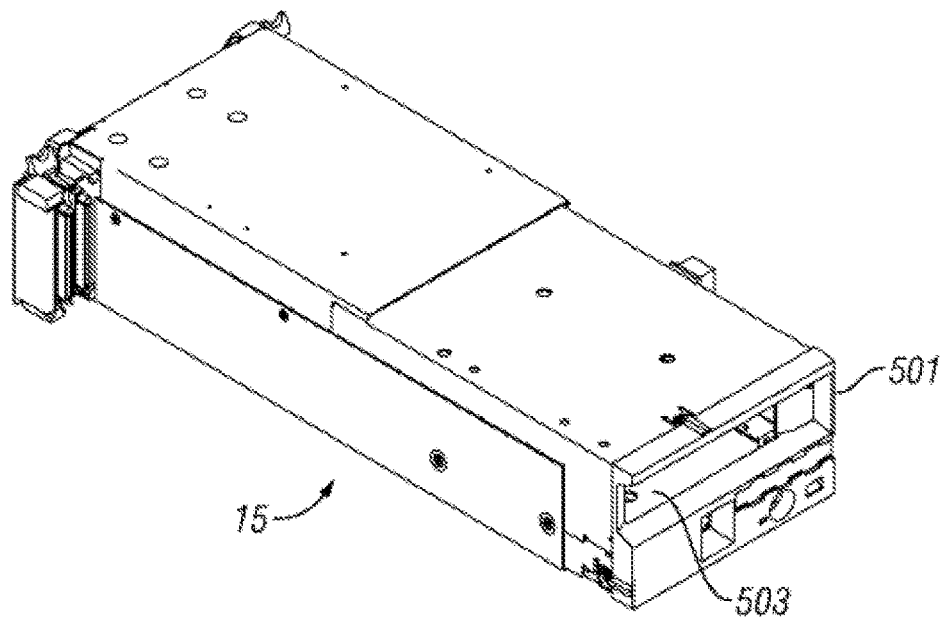
FIG. 5A is a front perspective view of a data storage drive according to one embodiment.
Figure 5B:
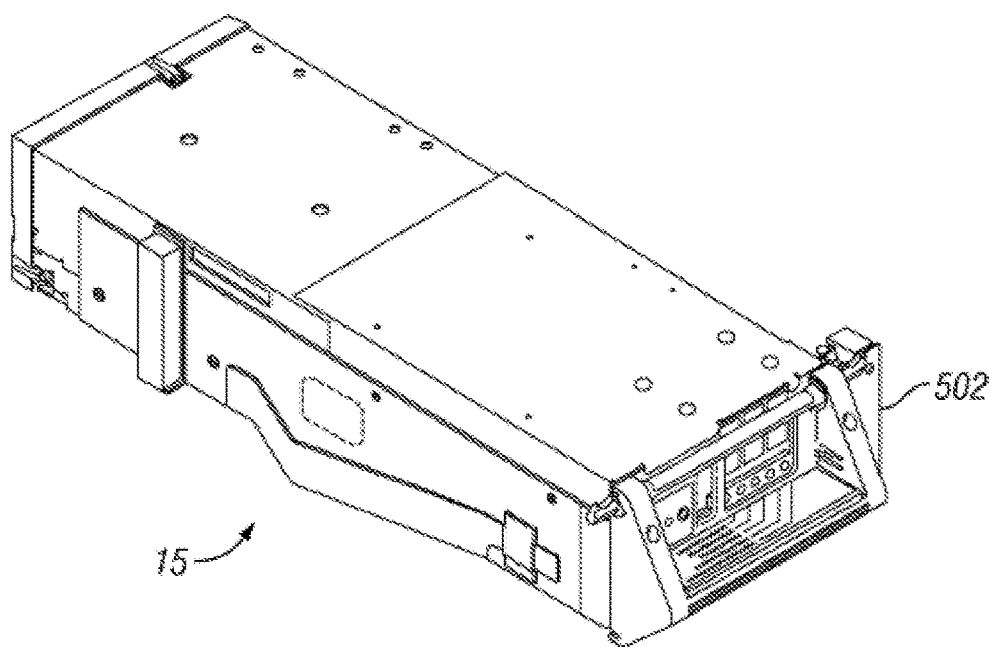
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
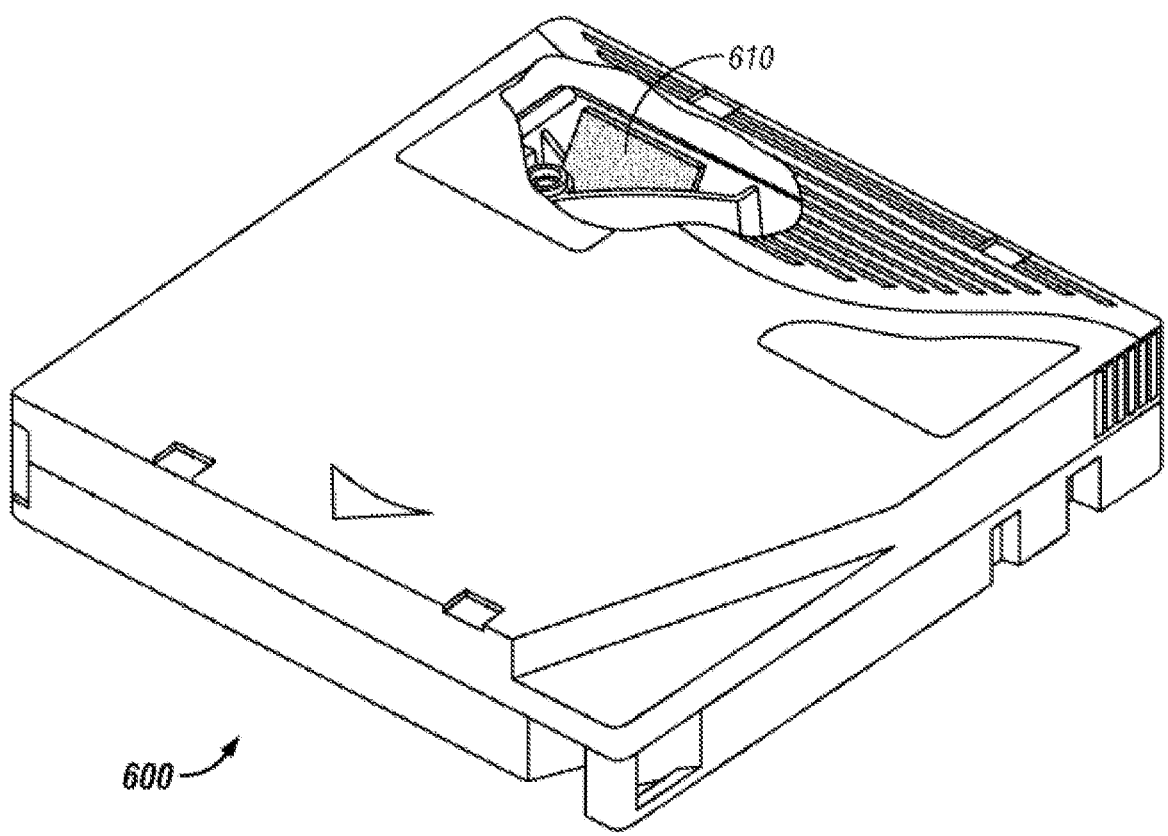
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
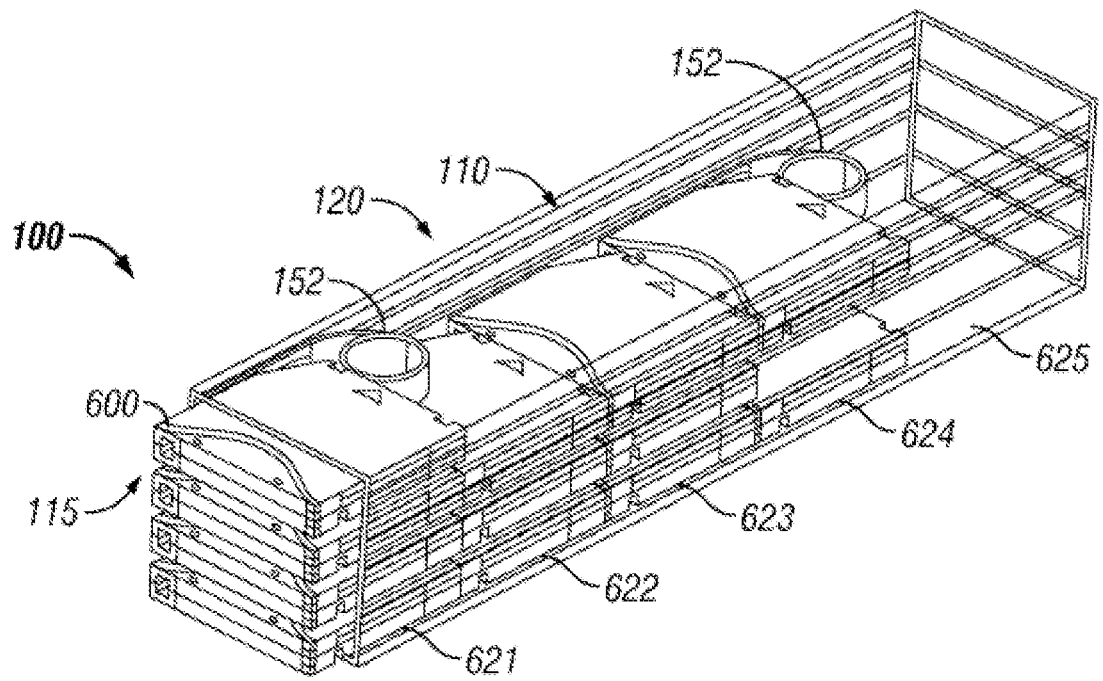
FIGS. 7A-7B are perspective views of multi-cartridge deep slot cells according to one embodiment.
Figure 7B:
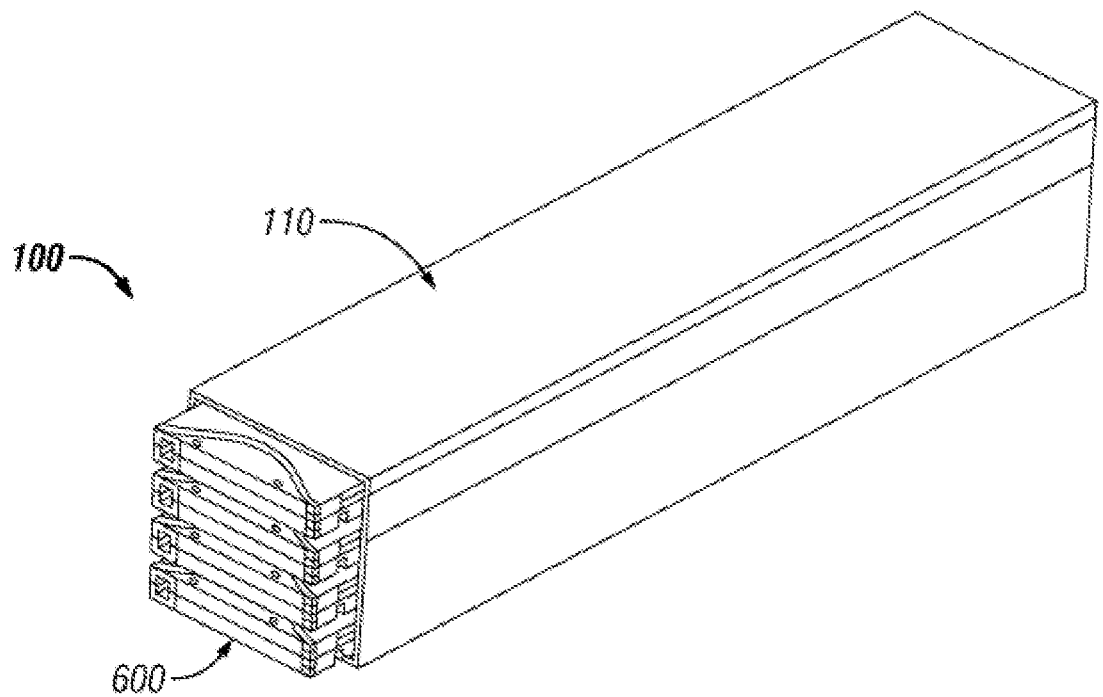

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
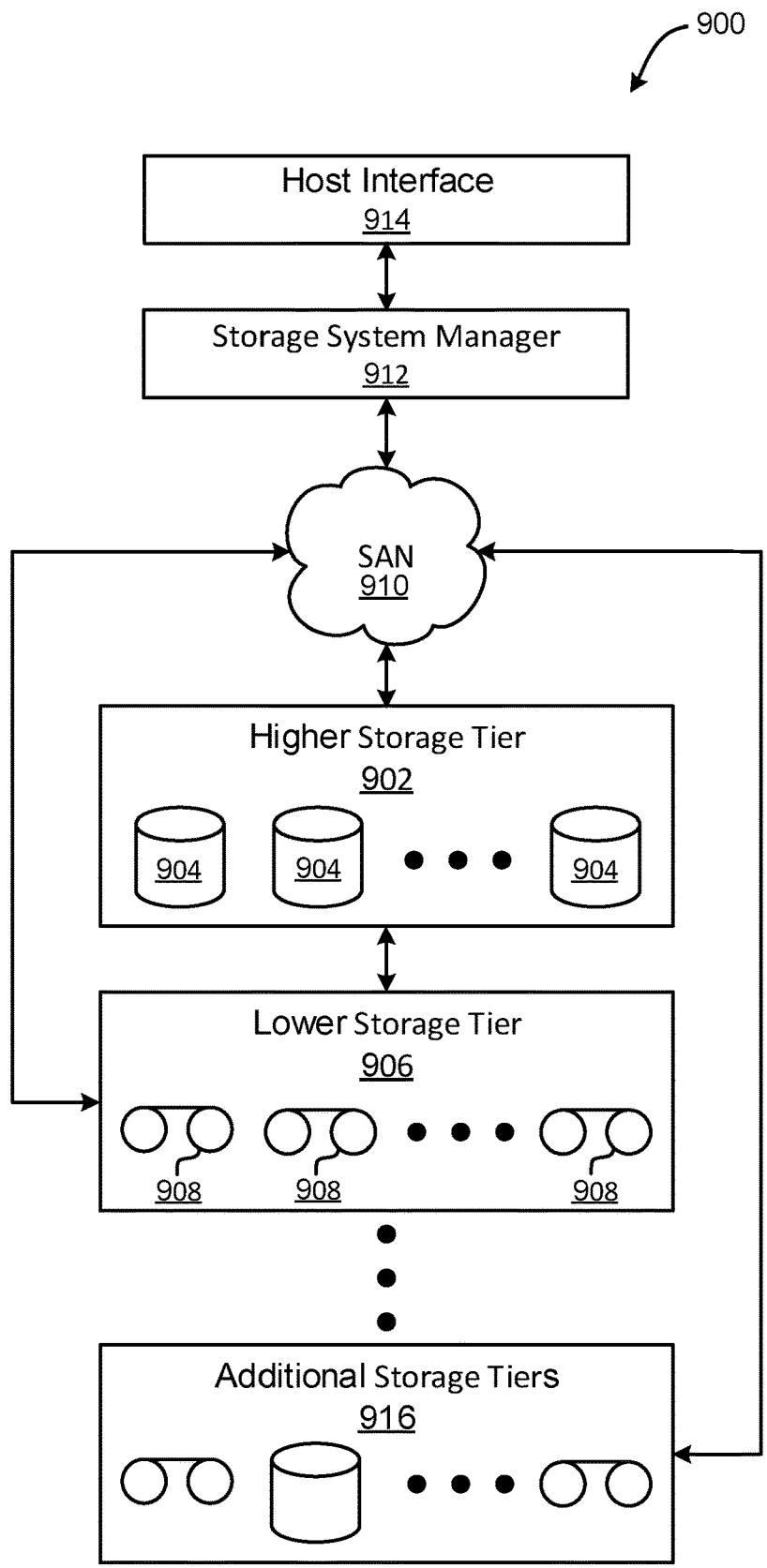
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Figure 10:
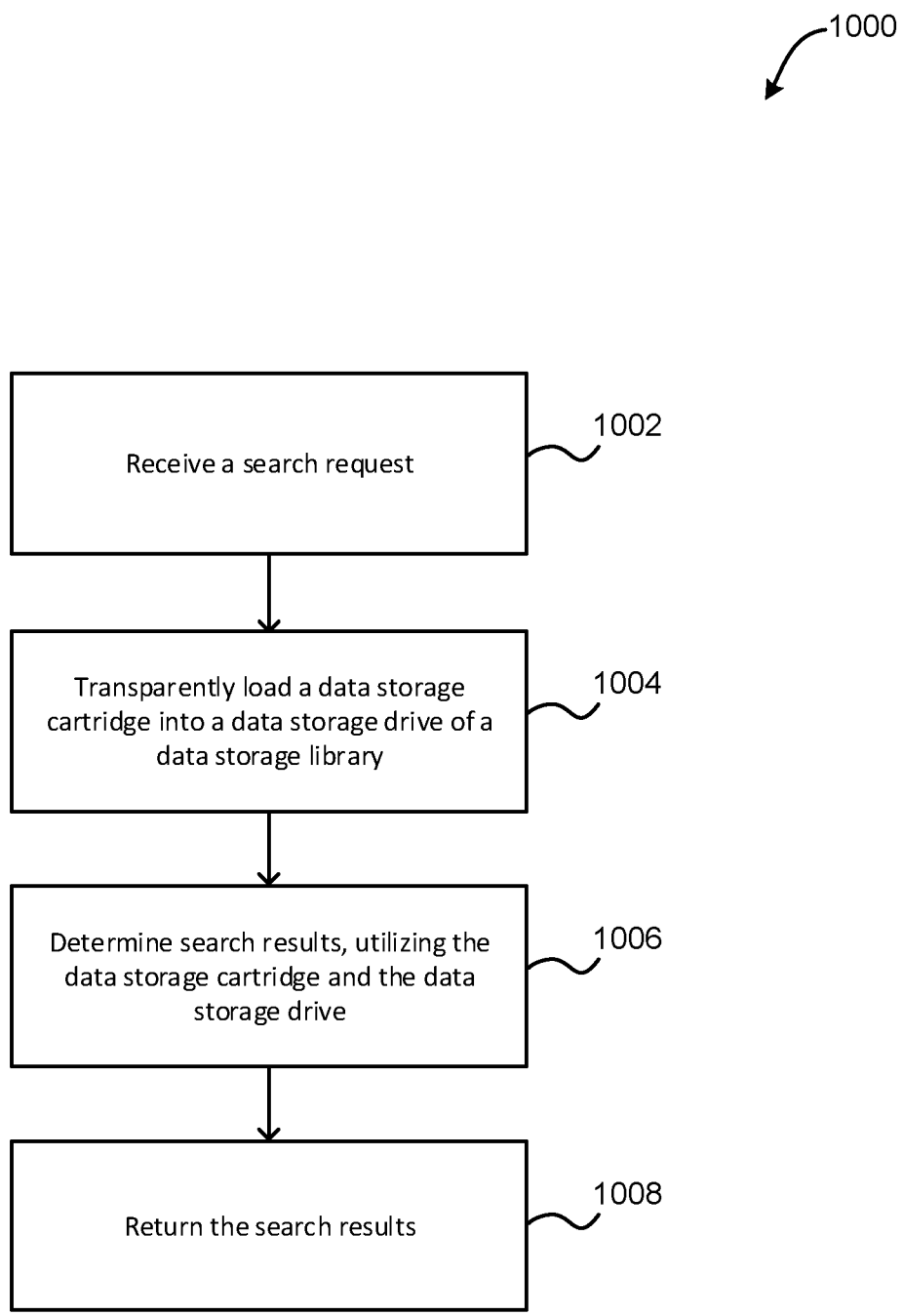
FIG. 10 illustrates a flowchart of a method for performing a search within a data storage library, in accordance with one embodiment.

Now referring to FIG. 10, a flowchart of a method 1000 is shown according to one embodiment. The method 1000 may be performed in accordance with the present invention in any of the environments depicted in FIGS. 1-9 and 12, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where a search request is received. In one embodiment, the search request may be received within a data storage library. For example, the search request may be initially received utilizing one or more management interfaces of the data storage library. For instance, the search request may be received from an entity (e.g., one or more of a user, an application, etc.), using one or more management interfaces.

Additionally, in one example, the management interfaces may include one or more of a remote network interface, a graphical user interface (GUI), an operator panel operatively coupled to the data storage library, a command line interface supported by the data storage library, an application programming interface (API), etc. In another embodiment, the one or more management interfaces may send the search request to a library controller of the data storage library.

Further, in one embodiment, the search request may include one or more search queries. For example, the search request may include one or more search parameters, keywords, topics, etc. In another embodiment, the search request may be received from a host system. For example, the search request may be received from a host application running within the host system. In another embodiment, the host application may include an application running within the host system that accesses the data storage library (e.g., to read and write data to and from data storage cartridges within the library, etc.). In yet another embodiment, the host application may include a backup application running on the host system.

Further still, method 1000 may proceed with operation 1004, where a data storage cartridge is transparently loaded into a data storage drive of a data storage library. In one embodiment, the data storage cartridge may be selected based on information found within the search request. For example, the search request may include an identification of one or more cartridges to be searched. In another embodiment, the data storage cartridge may be selected based on one or more characteristics of an entity from which the search request is received.

For example, one or more characteristics of the entity may include a level of access and/or one or more permissions associated with the entity. In another example, the request may include an access/permissions level associated with the entity that initiated the request. In yet another example, the one or more characteristics may include an identifier of the entity that initiated the request. For instance, the identifier may be included within the request. In another example, the identifier may be referenced in order to determine an access level associated with the entity, one or more cartridges associated with the entity, etc. In another embodiment, the data storage cartridge may be selected in response to a determination that data within the data storage cartridge is accessible by the entity, is owned by the entity, is associated with the entity, etc.

Also, in one embodiment, a plurality of cartridges may be transparently loaded into a plurality of data storage drives within the data storage library. In another embodiment, loading the data storage cartridge may include sending one or more instructions to a robotic mechanism (e.g., an accessor, etc.) to physically select the data storage cartridge and move it into the data storage drive.

In addition, in one embodiment, the data storage drive may include a host application drive. For example, the host application drive may include a data storage drive of the data storage library that is accessible/viewable by one or more host applications. In another example, the data storage cartridge may be transparently loaded into a host application drive of the data storage library.

For instance, the library controller may identify a host application drive that is not currently being used within the data storage library. In one embodiment, the library controller may then automatically load the data storage cartridge into the host application drive. In another embodiment, the host application drive may be presented as empty to all host applications running on host systems. For example, if a host application requests a library map (e.g., element address table, etc.) from the library controller, the library controller may provide a library map to the host application indicating that the data storage drive is empty.

Furthermore, in one embodiment, the data storage drive may include a utility drive. For example, the utility drive may include a data storage drive of the data storage library that is not accessible/viewable by any host applications. In another embodiment, the library controller may identify a utility drive that is not currently being used within the data storage library, and may transparently load the data storage cartridge into the utility drive of the data storage library. In yet another embodiment, the data storage cartridge may be presented by the library controller as being in its home slot.

For example, if a host application requests inventory data from the library controller, the library controller may provide inventory data to the host application indicating that the data storage cartridge is in its home slot, and not in the utility drive. In this way, the utility drive may not be visible by host applications, and may therefore not have to be instructed to identify as empty if its status is queried by any host application. In yet another embodiment, a plurality of cartridges may be transparently loaded into both one or more host application drives and one or more utility drives simultaneously, in response to receiving the search request.

Further still, in one embodiment, the data storage drive may be instructed to identify as empty if its status is queried by any host application. In this way, the data storage drive may appear as empty/open/accessible by both the library controller and the data storage drive itself. In another embodiment, the transparently loaded data storage cartridge may be presented by the library controller as being in its home slot. For example, the library controller may receive a request from a host application for inventory data, and in response, the library controller may provide inventory data to the host application indicating that the data storage cartridge is in its home slot, and not in the data storage drive.

Also, method 1000 may proceed with operation 1006, where search results are determined, utilizing the data storage cartridge and the data storage drive. In one embodiment, search results may be determined within the data storage library. In another embodiment, determining the search results may include instructing the data storage drive to perform the requested search. For example, the library controller may instruct the data storage drive to perform the search according to the search request. In another example, the library controller may provide one or more search parameters (e.g., parameters included in the search request, parameters added by the library controller, etc.) to the data storage drive.

Additionally, in one example, the data storage drive may then perform the search on the data located in the data storage cartridge to obtain search results. For instance, the data storage drive may perform the search utilizing cartridge search capabilities included within hardware/firmware/software of the data storage drive. In another example, the data storage drive may then return the search results to the library controller.

Further, in one embodiment, determining the search results may include performing the requested search at the library controller. For example, the library controller may send a request to the data storage drive for data from the data storage cartridge. In another example, the data storage drive may send the requested data to the library controller. In yet another example, the library controller may perform a search on the data, according to the search request, to obtain search results. In this way, the library controller may determine search results within the data storage library, without using any host applications or host systems.

Further still, method 1000 may proceed with operation 1008, where the search results are returned. In one embodiment, the search results may be returned to the entity from which the search request was obtained. In another embodiment, the search results may be returned utilizing the same management interface by which the search request was received. In yet another embodiment, the search results may be returned utilizing a different management interface from which the search request was received.

Also, in one embodiment, the management interface used to return the search results may be predetermined. For example, the management interface used to return the search results may be indicated in the search request, may be included in one or more settings associated with an entity, etc. In another embodiment, the search results may be returned to a host system.

In this way, a search may be performed on a data storage cartridge by one or more of the data storage drive and the library controller. This may eliminate a need to perform the search on one or more host systems/host applications, which may reduce an amount of processing necessary by the host systems/host applications, which may in turn improve a performance of the host systems/host applications.

Additionally, by performing the search at the data storage library instead of a host system, an amount of data sent from the data storage library to the host system may be reduced. For example, instead of sending unsearched data from the data storage library to the host system to be searched at the host system, only results of the search may be sent from the data storage library to the host system. This may result in a decrease in network traffic and bandwidth usage between the data storage library and host system during a search scenario, and may also improve a performance of components within a communications network between the data storage library and the host system (e.g., one or more switches, etc.).

Further, by performing the search at the data storage library instead of a host system the data storage library may reduce an amount of resources needed to communicate data to the host system during a search. This may improve a performance of the data storage library.

Further still, by transparently loading the data storage cartridge into the data storage drive of the data storage library, the search may be performed at the data storage library without interrupting the use of the data storage library by one or more host systems. This may reduce a wait time for data by the host systems, which may in turn improve a performance of the host systems.

Figure 11:
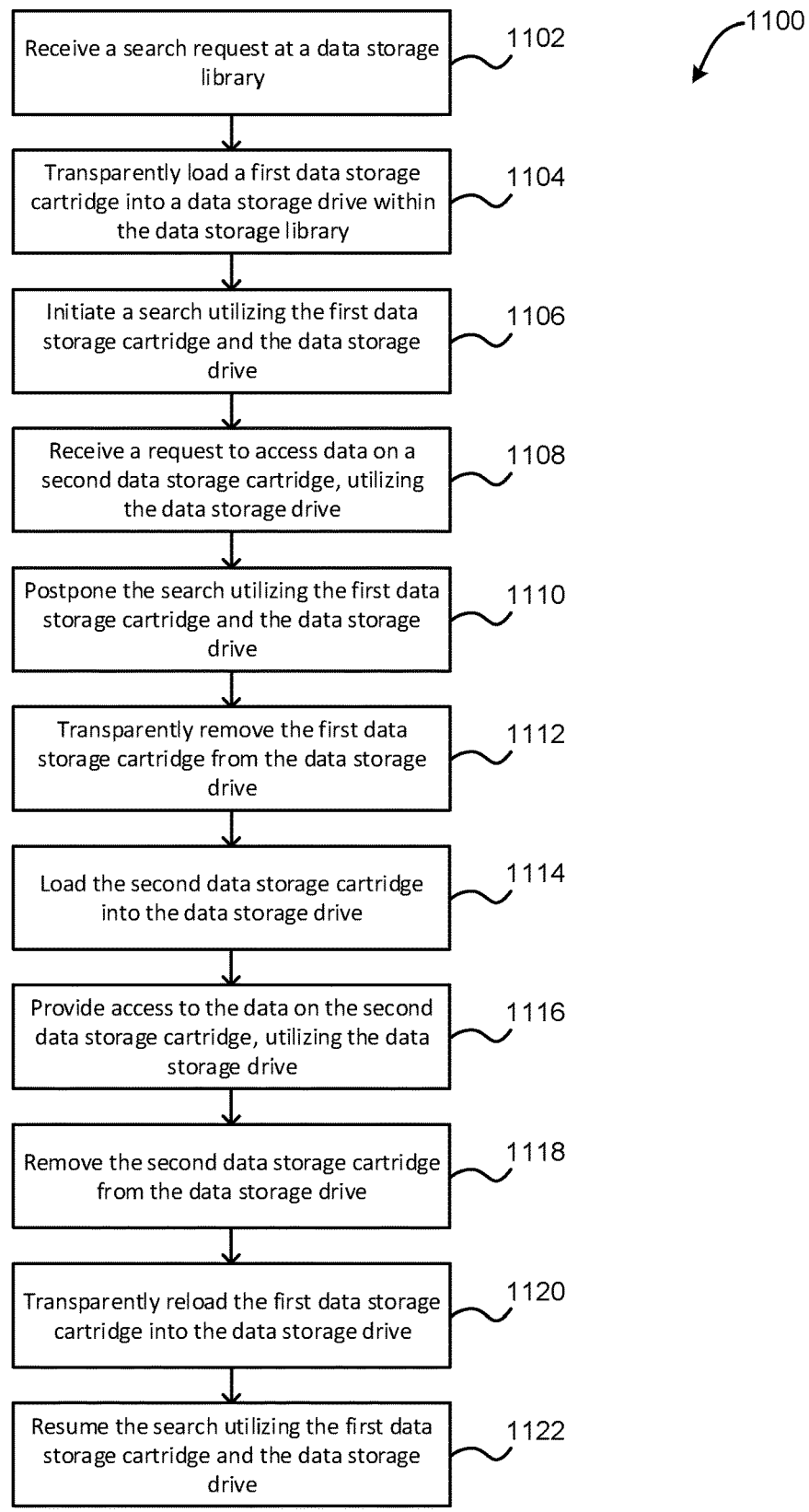
FIG. 11 illustrates a flowchart of a method for transparently managing data storage cartridges, in accordance with one embodiment.

Now referring to FIG. 11, a flowchart of a method 1100 for transparently managing data storage cartridges is shown according to one embodiment. The method 1100 may be performed in accordance with the present invention in any of the environments depicted in FIGS. 1-9 and 12, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a search request is received. Additionally, method 1100 may proceed with operation 1104, where a first data storage cartridge is transparently loaded into a data storage drive within the data storage library. Further, method 1100 may proceed with operation 1106, where a search is initiated utilizing the first data storage cartridge and the data storage drive. In one embodiment, the search may be initiated within the data storage library. In another embodiment, the search may be performed utilizing a library controller or the data storage drive.

Additionally, method 1100 may proceed with operation 1108, where a request is received to access data on a second data storage cartridge, utilizing the data storage drive. In one embodiment, the request may include a request to load the second data storage cartridge into the data storage drive. In another embodiment, the request may include a specific indication of the data storage drive. For example, the data storage drive may be presented to the host application as empty by the library controller, and the host application may request that the data storage drive be used by the host controller to access data in the second data storage cartridge.

Further, method 1100 may proceed with operation 1110, where the search utilizing the first data storage cartridge and the data storage drive is postponed. In one embodiment, the search may be paused or stopped completely before it has completed. In another embodiment, partial results of the search (e.g., a current state of the search and/or current search results resulting from the search before it was postponed, etc.) may be saved locally at the library controller.

Further still, method 1100 may proceed with operation 1112, where the first data storage cartridge is transparently removed from the data storage drive. In one embodiment, the first data storage cartridge may be returned to its home slot without informing a host application/host system. In another embodiment, the request to access data on the second data storage cartridge may be intentionally delayed during the transparent removal of the first data storage cartridge.

Also, method 1100 may proceed with operation 1114, where the second data storage cartridge is loaded into the data storage drive. In one embodiment, the second data storage cartridge may be removed from its home slot and inserted into the data storage drive. In yet another embodiment, the library controller may update inventory data to indicate that the second data storage cartridge is not in its home slot. In still another embodiment, the library controller may update a library map (e.g., element address table, etc.) to indicate that the second data storage cartridge is loaded into the data storage drive.

In addition, method 1100 may proceed with operation 1116, where access to the data on the second data storage cartridge is provided, utilizing the data storage drive. In one embodiment, the access may include modifying the data on the second data storage cartridge. For example, the request to access data may include a request sent by a host application to write, modify, or delete data on the second data storage cartridge. In another example, providing access to the data on the second data storage cartridge may include modifying, by the data storage drive, the data on the second data storage cartridge.

Furthermore, in one embodiment, the access may include reading the data on the second data storage cartridge. For example, the request to access data may include a request sent by a host application to read data from the second data storage cartridge. In another example, providing access to the data on the second data storage cartridge may include reading, by the data storage drive, the data on the second data storage cartridge, and providing the data to the library controller.

Further still, in one embodiment, the library controller may return read data from the second data storage cartridge to the host application. In another embodiment, the library controller may send a confirmation of a modification of the data within the second data storage cartridge to the host application.

Also, method 1100 may proceed with operation 1118, where the second data storage cartridge is removed from the data storage drive. In one embodiment, the second data storage cartridge may be removed from the data storage drive in response to a completion of desired access to the data on the second data storage cartridge, or in response to a host request to move the cartridge to its home slot or some other slot in the library. In another embodiment, the second data storage cartridge may be inserted into its home slot or another slot in the library. In yet another embodiment, the library controller may update inventory data to indicate that the second data storage cartridge is in its new location (e.g., its home slot or some other slot in the library). In still another embodiment, the library controller may update a library map (e.g., element address table, etc.) to indicate that the data storage drive is empty.

Additionally, method 1100 may proceed with operation 1120, where the first data storage cartridge is transparently reloaded into the data storage drive, or loaded into a second data storage drive. In one embodiment, the first data storage cartridge may be transparently loaded into a data storage drive in response to a determination by the library controller that the data storage drive is empty.

Further, method 1100 may proceed with operation 1122, where the search is resumed utilizing the first data storage cartridge and a data storage drive. In one embodiment, the search may be resumed from the point where it was postponed. For example, the partial results of the search may be retrieved and added to during the resumed search. In another embodiment, a new search may be initiated utilizing the first data storage cartridge and the data storage drive. For example, the partial results of the search may be discarded and a new search may be performed. Operation 1120 and/or 1122 may be performed at any time after removing the first data storage cartridge from the data storage drive in operation 1112. For example, another empty data storage drive may be utilized to resume the search. Still further, operation 1120 and/or 1122 may be omitted (e.g., if the desired behavior is to stop the search operation after a conflict for the data storage drive has occurred).

In this way, an effect that the search of the first data storage cartridge has on an availability of the data storage drive may be minimized.

Figure 12:
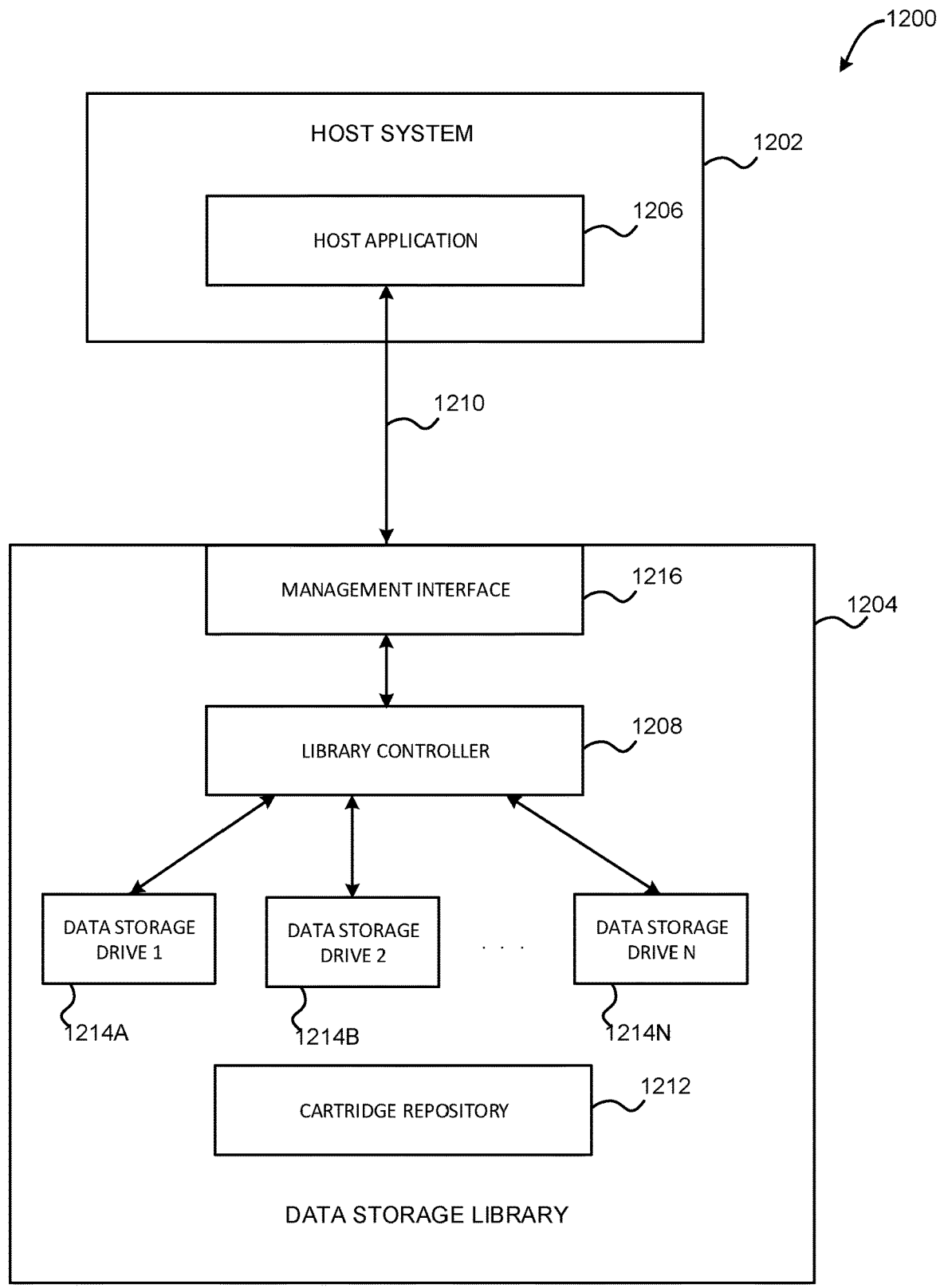
FIG. 12 illustrates an exemplary an exemplary cartridge search environment, in accordance with one embodiment.

FIG. 12 illustrates an exemplary cartridge search environment 1200, according to one exemplary embodiment. As shown, a host system 1202 is in communication with a data storage library 1204. It should be noted that, although a single host system 1202 is pictured, a plurality of host systems may be in communication with the data storage library 1204 simultaneously.

Additionally, in one embodiment, a host application 1206 running within the host system 1202 may send a search request to a management interface 1216 of the data storage library 1204 over a communications network 1210. In one embodiment, the communications network 1210 may include an ethernet connection, a fiber channel connection, etc. Of course, however, the search request may be received from an entity other than the host system 1202. In another embodiment, in response to receiving the search request, the management interface 1216 may send the search request to the library controller 1208 within the data storage library 1204. In yet another embodiment, in response to receiving the search request, the library controller 1208 may identify a data storage drive 1214A as open/empty/available from a plurality of data storage drives 1214A-N. In still another embodiment, more than one library controller 1208 may be located within the data storage library 1204.

Further, in one embodiment, in response to receiving the search request, the library controller 1208 may also select a first data storage cartridge from the data storage cartridge repository 1212, based on the received search request. In another embodiment, the library controller 1208 may transparently load the first data storage cartridge into the data storage drive 1214A. In another embodiment, the library controller 1208 may instruct the data storage drive 1214A to perform a search on the first data storage cartridge. In yet another embodiment, the library controller 1208 may retrieve, from the data storage drive 1214A, data from the first data storage cartridge, and the library controller 1208 may perform the search on the retrieved data.

Further still, in one embodiment, because the library controller 1208 may transparently load the selected cartridge into the data storage drive 1214A, the host application 1206 may view the data storage drive 1214A as open/empty/available, and may send an access request for data on a second data storage cartridge, utilizing the data storage drive 1214A, to the library controller 1208. In response to receiving the access request, the library controller 1208 may determine that the search of the first data storage cartridge on the data storage drive 1214A has not completed, and may postpone the search of the first data storage cartridge on the data storage drive 1214A as a result.

Also, in one embodiment, the library controller 1208 may then transparently remove the first data storage cartridge from the data storage drive 1214A, and may return the first data storage cartridge to the data storage cartridge repository 1212. Alternatively, the library controller 1208 may transparently remove the first data storage cartridge from the data storage drive 1214A, and may place it in another empty data storage drive (e.g., data storage drive 1214B) in a transparent manner for the purpose of resuming or restarting the search on the first data storage cartridge. The library controller 1208 may then retrieve the second data storage cartridge from the data storage cartridge repository 1212 and may load the second data storage cartridge into the data storage drive 1214A in a non-transparent manner (e.g., such that the host application 1206 now views the data storage drive 1214A as full, etc.). Access to the data on the second data storage cartridge may then be performed utilizing the data storage drive 1214A, according to requests sent by the host application 1206.

In addition, once the access to the data on the second data storage cartridge has completed, the library controller 1208 may then remove the second data storage cartridge from the data storage drive 1214A and may place the second data storage cartridge back in the data storage cartridge repository 1212 in a non-transparent manner (e.g., such that the host application 1206 now views the data storage drive 1214A as empty, etc.). The library controller may then transparently load the first data storage cartridge back into the data storage drive 1214A, and may resume or restart the search on the first data storage cartridge (unless the cartridge had already been loaded into another empty drive as described above).

Furthermore, in one embodiment, when the search on the first data storage cartridge has completed, the library controller may send the results of the search to the management interface 1216 of the data storage library 1204, and the management interface 1216 may return the results to the host system 1202 (or any other entity that initiated the search). In another embodiment, the results of the search may be returned utilizing a different management interface from the management interface 1216 used by the library controller 1208 to receive the search request.

In this way, a requested search may be performed at the library controller 1208 and/or the data storage drive 1214A, instead of at the host application 1206 of the host system 1202. This may reduce an amount of processing by the host system 1202, may reduce an amount of necessary transmissions sent by the library controller 1208, and may reduce an amount of bandwidth usage over the communications network 1210.

Some automated data storage libraries provide a feature that verifies the health of the media in the library. For example, an automated data storage library may provide a media verification function where the cartridges are periodically accessed (loaded, threaded, read, and/or written) to confirm that the cartridges and/or the media within the cartridges is still viable. A media search operation may be used as another mechanism for indicating that the media is viable. For example, as each data storage cartridge is searched, it may be flagged as being "verified" for purposes of media verification. Herein, media verification may refer to verification of the cartridge and/or the storage medium associated with the cartridge.

Cartridge Search Capability in an Automated Data Storage Library

Overview

In one embodiment, an automated data storage library may provide a non-disruptive search capability of one or more cartridges within the library. The search may be initiated via a user interface of the library (e.g., a web user interface, an operator panel, a command line interface, an application programming interface, a simple network management protocol (SNMP), etc.).

Additionally, in one embodiment, cartridges may be transparently loaded into data storage drives, and the drives may perform search operations on the contents of the cartridges. The search results may then be provided via a user interface of the library (e.g., a web user interface, an operator panel, a command line interface, an application programming interface, an SNMP, one or more output data files, etc.).

DESCRIPTION

In one embodiment, an automated data storage library may provide a non-disruptive search capability of one or more cartridges within the library. For example, a search may be initiated via a user interface of the library (e.g., a web user interface, an operator panel, a command line interface, an application programming interface, an SNMP, etc.). Cartridges may then be transparently loaded into data storage drives, and the drives may perform search operations on the contents of the cartridges.

Additionally, in one embodiment, the search operation may use a built-in search capability provided by the drive or it may use individual data access commands to perform the search and build results. The search results may be provided via a user interface of the library (e.g., a web user interface, an operator panel, a command line interface, an application programming interface, an SNMP, etc.).

Further, in one embodiment, the following may be implemented to make the search transparent and non-disruptive:

The library may wait for an empty drive and then transparently load a cartridge to be searched into the drive.

The library may then instruct the drive that was transparently loaded to report to host applications as being empty.

Utility drives that are not associated with application drives that may be used to transparently load one or more cartridges.

The library may report inventory data showing that a transparently loaded cartridge is still located in its home slot.

In this way, data may be searched within the data storage library, in a manner transparent to a host computer or application. The search may be initiated by a user interface of the library and the results may be provided to a user interface of the library. Involvement of the host computer or host application in the search may therefore be avoided. By making the searching transparent to the host computer/application, host application implementation of data search capabilities may be avoided, which may save time and resources, and may improve host application support.

Additionally, the tape drives of the storage library may be accessed in a manner that is transparent to the host system. For example, a host computer/application may not know that the data storage drive is being used for a background search operation so any conflict of data storage drive resources required by a host computer/application may be avoided during a search.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a search request;
   transparently loading a data storage cartridge into a data storage drive of a data storage library, including providing an indication to an application that the data storage cartridge is located in a storage slot while it is loaded into the data storage drive;

determining search results, utilizing the data storage cartridge and the data storage drive; and returning the search results.

2. The computer-implemented method of claim 1, wherein the indication that the data storage cartridge is located in the storage slot is provided to the application in response to receiving a request for inventory data from the application.

3. The computer-implemented method of claim 1, wherein the data storage cartridge is selected based on information found within the search request, the information including:

an identification of the data storage cartridge, an identifier of an entity that initiated the search request, and a level of access and permissions associated with the entity that initiated the search request;

wherein the data storage cartridge is selected and transparently loaded into the data storage drive in response to determining that the data storage cartridge is accessible by the entity that initiated the search request.

4. The computer-implemented method of claim 1, wherein the data storage drive includes a utility drive that is not accessible by host applications, and that is not currently being used within the data storage library.

5. The computer-implemented method of claim 1, wherein transparently loading the data storage cartridge into the data storage drive of the data storage library includes:

identifying a host application drive that is not currently being used within the data storage library;

loading the data storage cartridge into the host application drive; and presenting the host application drive as empty to all host applications running on host systems.

6. The computer-implemented method of claim 1, wherein transparently loading the data storage cartridge into the data storage drive of the data storage library includes:

identifying a drive that is not currently being used within the data storage library; and loading the data storage cartridge into the drive of the data storage library.

7. The computer-implemented method of claim 1, wherein the indication that the data storage cartridge is located in a storage slot is sent to the application in response to a request from the application for inventory data.

8. The computer-implemented method of claim 1, wherein:

the search request is received at a library controller from a host application separate from the library controller, determining the search results includes:

sending, from the library controller to the data storage drive, a request for data from the data storage cartridge, receiving the requested data at the library controller from the data storage drive, and performing, by the library controller, a search on the data according to the search request to obtain the search results, and the search results are returned by the library controller to the host.

9. The computer-implemented method of claim 1, wherein the search results are returned to a management interface by which the search request was received, a different management interface from which the search request was received, or the management interface by which the search request was received and the different management interface from which the search request was received.

10. The computer-implemented method of claim 1, further comprising flagging the data storage cartridge as being verified.

11. A computer program product for performing a search within a data storage library, the computer program product comprising a computer readable storage medium having program instructions embodied therewith, wherein the computer readable storage medium is not a transitory signal per se, the program instructions executable by a processor to cause the processor to perform a method comprising:

receiving a search request, utilizing the processor;

transparently loading a data storage cartridge into a data storage drive of a data storage library, utilizing the processor, including providing an indication to an application that the data storage cartridge is located in a storage slot while it is loaded into the data storage drive;

determining, utilizing the processor, search results, utilizing the data storage cartridge and the data storage drive; and returning the search results, utilizing the processor.

12. The computer program product of claim 11, wherein the search request is received from an entity, using one or more management interfaces.

13. The computer program product of claim 11, wherein the data storage cartridge is selected based on one or more characteristics of an entity from which the search request is received.

14. The computer program product of claim 11, wherein the data storage drive is selected from a group consisting of a host application drive and a utility drive.

15. The computer program product of claim 11, wherein transparently loading the data storage cartridge into the data storage drive of the data storage library includes:

identifying a host application drive that is not currently being used within the data storage library, utilizing the processor;

loading the data storage cartridge into the host application drive, utilizing the processor; and presenting the host application drive as empty to all host applications running on host systems, utilizing the processor.

16. A library controller, comprising:

a processor; and logic integrated with the processor, executable by the processor, or integrated with and executable by the processor, the logic being configured to:

receive a search request;

transparently load a data storage cartridge into a data storage drive of a data storage library, including providing an indication to an application that the data storage cartridge is located in a storage slot while it is loaded into the data storage drive;

determine search results, utilizing the data storage cartridge and the data storage drive; and return the search results.

17. A computer-implemented method, comprising:

receiving a search request at a data storage library;

transparently loading a first data storage cartridge into a first data storage drive within the data storage library, including providing an indication to an application that the first data storage cartridge is located in a storage slot while it is loaded into the first data storage drive;

initiating a search utilizing the first data storage cartridge and the first data storage drive;

receiving a request to access data on a second data storage cartridge, utilizing the first data storage drive;

postponing the search utilizing the first data storage cartridge and the first data storage drive;

transparently removing the first data storage cartridge from the first data storage drive;

loading the second data storage cartridge into the first data storage drive; and providing access to data on the second data storage cartridge, utilizing the first data storage drive.

18. The computer-implemented method of claim 17, wherein transparently removing the first data storage cartridge from the first data storage drive further comprises:

transparently loading the first data storage cartridge into a second data storage drive; and:

resuming the search utilizing the first data storage cartridge and the second data storage drive, restarting the search utilizing the first data storage cartridge and the second data storage drive, or resuming the search utilizing the first data storage cartridge and the second data storage drive, and restarting the search utilizing the first data storage cartridge and the second data storage drive.

19. The computer-implemented method of claim 17, wherein loading the second data storage cartridge includes:

removing the second data storage cartridge from its home slot;

inserting the second data storage cartridge into the first data storage drive;

updating inventory data to indicate that the second data storage cartridge is not in its home slot; and updating a library map to indicate that the second data storage cartridge is loaded into the first data storage drive.

20. The computer-implemented method of claim 17, further comprising:

removing the second data storage cartridge from the first data storage drive;

transparently reloading the first data storage cartridge into the first data storage drive; and resuming the search utilizing the first data storage cartridge and the first data storage drive.

21. The computer-implemented method of claim 20, wherein the search utilizing the first data storage cartridge and the first data storage drive is resumed from a point where it was postponed.

22. The computer-implemented method of claim 20, wherein resuming the search utilizing the first data storage cartridge and the first data storage drive includes initiating a new search utilizing the first data storage cartridge and the first data storage drive.

23. A computer-implemented method, comprising:

receiving a search request;

transparently loading a data storage cartridge into a data storage drive of a data storage library, including:

identifying a data storage drive that is not currently being used within the data storage library, loading the data storage cartridge into the data storage drive, and providing an indication to an application that the data storage cartridge is located in a storage slot while it is loaded into the data storage drive;

determining search results, utilizing the data storage cartridge and the data storage drive; and returning the search results.

24. The method of claim 23, further comprising:

receiving, from a host application, a request for a library map, and providing to the host application the library map, where the library map indicates that the data storage drive is empty.

25. The method of claim 23, wherein the indication that the data storage cartridge is located in a storage slot is sent to the application in response to a request from the application for inventory data.

* * * * *